United States Patent
Minick et al.

(10) Patent No.: US 8,839,761 B2
(45) Date of Patent: Sep. 23, 2014

(54) AUGMENTER FOR COMPOUND COMPRESSION ENGINE

(75) Inventors: Alan B. Minick, Huntsville, AL (US); Alfred Little, Simi Valley, CA (US)

(73) Assignee: Aerojet Rocketdyne of DE, Inc., Canoga Park, CA (US)

(*) Notice: Subject to any disclaimer, the term of this patent is extended or adjusted under 35 U.S.C. 154(b) by 556 days.

(21) Appl. No.: 12/830,604

(22) Filed: Jul. 6, 2010

(65) Prior Publication Data

US 2010/0269782 A1     Oct. 28, 2010

(51) Int. Cl.
*F02B 53/08* (2006.01)
*F02B 53/04* (2006.01)
*F02B 53/00* (2006.01)
*F02B 41/06* (2006.01)
*F01C 11/00* (2006.01)
*F01C 1/22* (2006.01)

(52) U.S. Cl.
CPC ............... *F02B 53/00* (2013.01); *F02B 41/06* (2013.01); *Y02T 10/17* (2013.01); *F01C 11/004* (2013.01); *F01C 1/22* (2013.01)
USPC .......................................... 123/213; 123/215

(58) Field of Classification Search
USPC .................. 123/213, 215; 60/39.63
See application file for complete search history.

(56) References Cited

U.S. PATENT DOCUMENTS

| | | | | |
|---|---|---|---|---|
| 2,993,482 A | | 7/1961 | Froeda | |
| 3,139,722 A | | 7/1964 | Yokoi | |
| 3,228,183 A | * | 1/1966 | Feller | 60/605.1 |
| 3,732,689 A | * | 5/1973 | Tado et al. | 60/605.1 |
| 3,782,337 A | * | 1/1974 | Feller | 123/213 |
| 3,783,615 A | * | 1/1974 | Hubers | 123/213 |
| 3,817,220 A | * | 6/1974 | Brumm et al. | 123/207 |
| 3,970,050 A | * | 7/1976 | Hoadley | 123/213 |
| 5,101,782 A | | 4/1992 | Yang | |
| 2008/0216792 A1 | * | 9/2008 | Hartfield | 123/213 |

* cited by examiner

*Primary Examiner* — Kenneth Bomberg
*Assistant Examiner* — Deming Wan
(74) *Attorney, Agent, or Firm* — Joel G Landau

(57) ABSTRACT

A rotary engine includes a first rotary unit operable to provides a first phase of compression to a fresh air charge drawn in through an inlet port to the first rotary unit. A second rotary unit in communication with the first rotary unit through a first passage, the second rotary unit operable to provide a second phase of compression to the first phase of compression, a combustion phase and a first phase of expansion, the second rotary unit in communication with the first rotary unit through a second passage such that the first rotary unit provides a second phase of expansion to the first phase of expansion and an exhaust phase that exhausts the first rotary unit via an exhaust port. A first fuel injector is in communication with the second rotary unit operable to initiate the combustion phase and a second fuel injector is in communication with the first rotary unit operable to selectively initiate augmented operation.

1 Claim, 3 Drawing Sheets

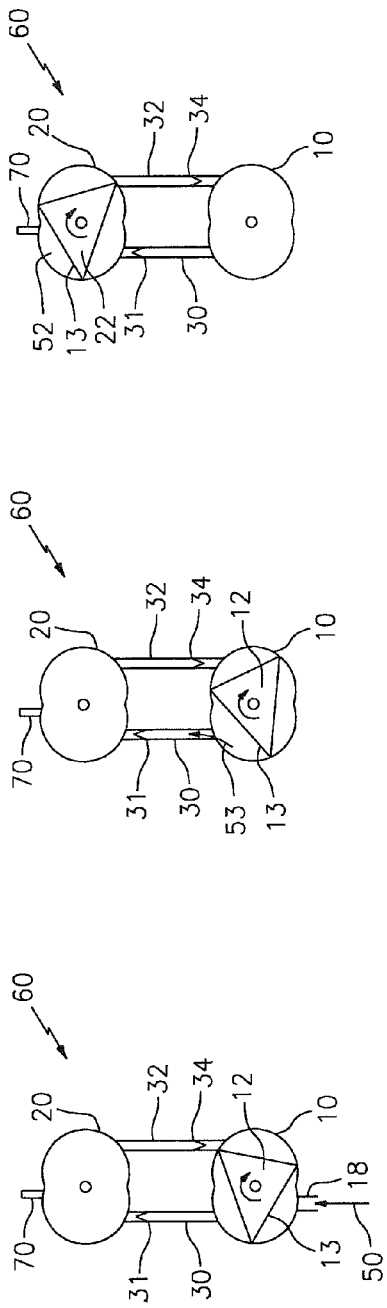

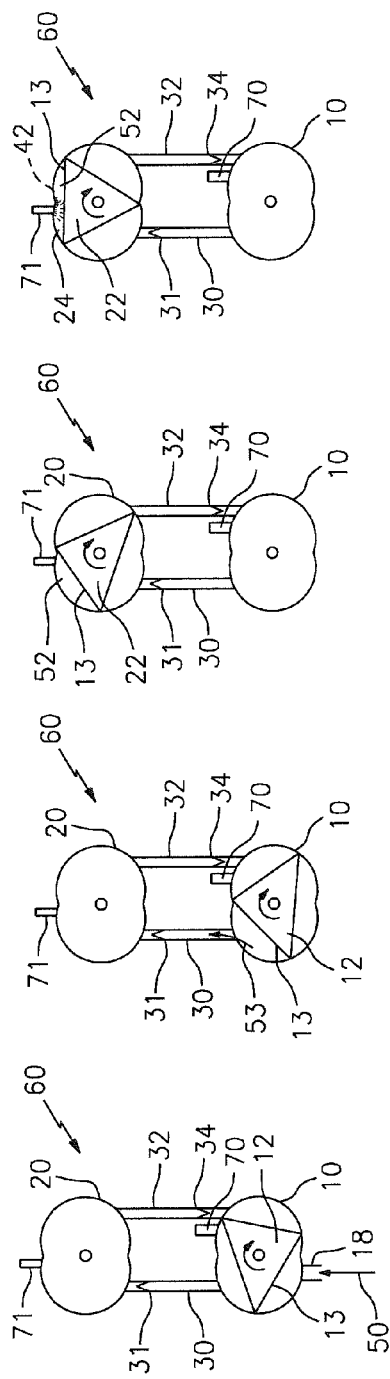
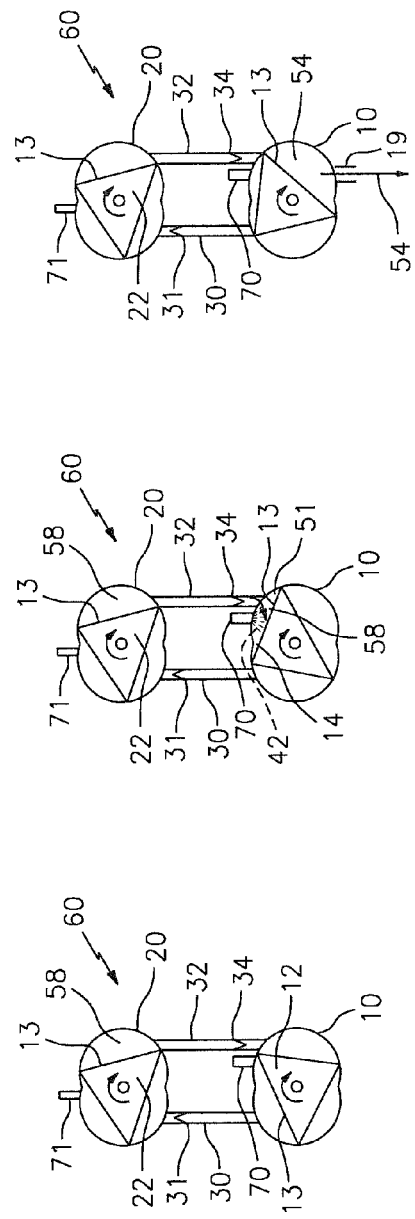

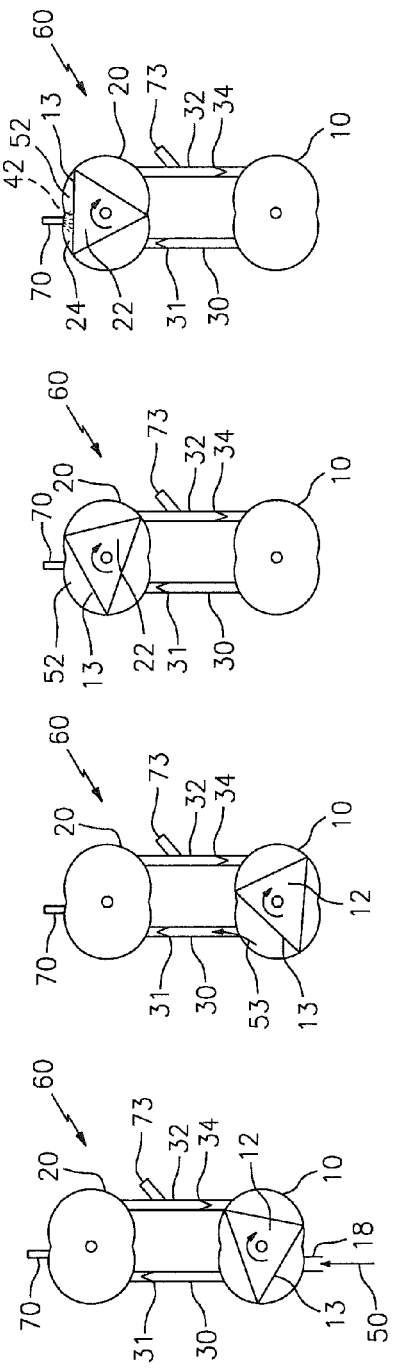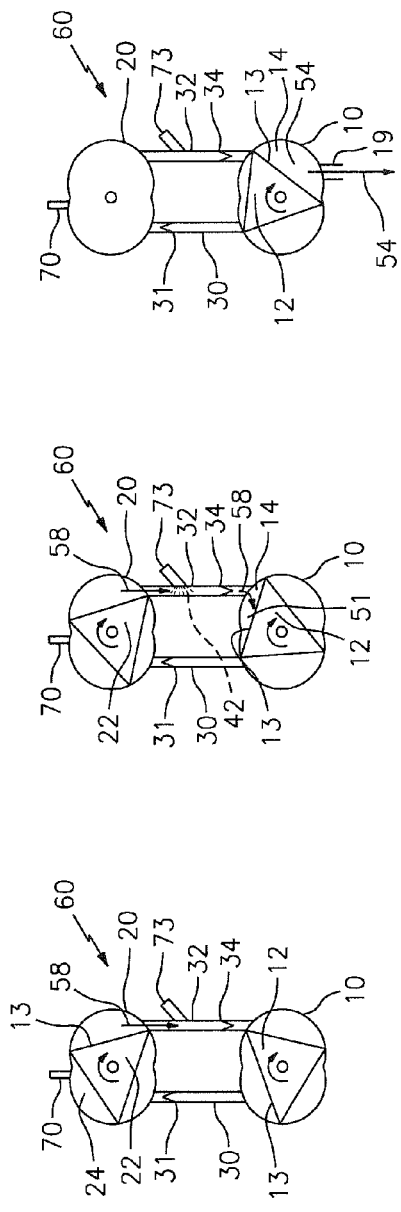

AUGMENTER FOR COMPOUND COMPRESSION ENGINE

BACKGROUND

Engines typically compress air or other gaseous oxidizers prior to adding fuel and ignition to produce power. When positive displacement compression is physically separate from the power producing feature there is often unused remaining compressed air. Many examples of engines with separable positive displacement compression systems exist. One example can be conceptualized from a Wankel engine. The Wankel engine, invented by German engineer Felix Wankel is a type of internal combustion engine which uses a rotary design. Its cycle takes place in a space between the inside of an oval-like epitrochoid-shaped housing and a rotor that is similar in shape to a Reuleaux triangle but with sides that are somewhat flatter. This design delivers smooth high-rpm power from a compact size. Since its introduction, the engine has been commonly referred to as the rotary engine. An improvement on the rotary engine uses one rotor as a compressor to provide compressed air to a second rotor. The compressed air is then further compressed in the second rotor in advance of combustion. In some embodiments the exhaust of the second rotor is returned to the expanding section of the compressor rotor, thereby providing power recovery and increasing efficiency. This configuration has been referred to as a compound rotary engine.

BRIEF DESCRIPTION OF THE DRAWINGS

FIGS. 1a-1f are a graphical representation of a first rotor section and a second rotor section in a non afterburning mode.

FIGS. 2a-2g are graphical representations of a first rotor section and a second rotor section in an afterburning mode where the first rotor section has an injector.

FIGS. 3a-3g are graphical representations of a first rotor section and a second rotor section in an afterburning mode where the second passageway has a passageway injector.

DETAILED DESCRIPTION OF THE PREFERRED EMBODIMENTS

FIGS. 1a-1e represent a non-limiting embodiment of a compound rotary engine 60. The compound rotary engine 60 has a first rotary unit 10 coupled with a second rotary unit 20. A compressed air charge 53 is communicated via passageway 30 from the first rotary unit 10 to the second rotary unit 20. A second rotary unit exhaust 58 from the second rotary unit 20 is communicated to the first rotary unit 10 via passageway 32. Additionally, the second rotary unit 20 has an injector 70 in communication with the second chamber 24. In this configuration, the first rotary unit 10 operates as a supercharger and as an additional expander of the second rotary unit exhaust 58 second rotary unit Referring to FIG. 1a, a fresh air charge 50 is drawn in through an inlet port 18 into a first rotary unit 10.

Referring to FIG. 1b, the first rotor 12 compresses the fresh air charge 50 (not shown) into a compressed air charge 53. The compressed air charge 53 reaches a pressure that overcomes the spring force that normally keeps the first passageway check valve 31 closed. Once opened, the compressed air charge 53 flows into the second rotary unit 20. In another non-limiting embodiment, the check valve is omitted. In additional non-limiting embodiments, the passageways may include valves controlled by electronically activated motors (not shown).

Referring to FIG. 1c, the second rotor 22 further compresses the compressed air charge 53 (not shown) into a compound compressed air charge 52. A compound compressed air charge 52 is a compressed air charge 53 which is then further compressed in the second rotor in advance of combustion.

Referring to FIG. 1d, the second rotor 22, near or at top dead center, and the second chamber 24, at or near minimal working volume, is injected with fuel 42 via an injector 70. The fuel 42 may be a light fuel (e.g., natural gas, gasoline, hydrogen), or a heavy fuel (e.g., JP-8, JP-4, diesel and others). A mixture of the compound compressed air charge 52 and the fuel 42 is then combusted. Combustion can be initiated via auto ignition (diesel) or spark ignition (not shown).

Referring to FIG. 1e, the second rotary unit exhaust 58 leaves the second rotary unit 20 via a second passageway 32. The pressure of the second rotary unit exhaust 58 overcomes the spring force that normally keeps the second passageway check valve 34 closed. The second rotary unit exhaust 58 enters the first rotary unit 10. In another non-limiting embodiment the check valve is omitted. The second rotary unit exhaust 58 further expands, asserting pressure on the rotor face 13, thereby causing the first rotor 12 to rotate and drive a common shaft (not shown).

Referring to FIG. 1f, the second rotary unit exhaust 58 exits the first rotary unit 10 via an exhaust port 19. The force behind this action is that the second rotary unit exhaust 58 is at a higher pressure than the ambient atmosphere.

The common shaft of the first and second rotors 12,22 (not shown) completes three crank revolutions for each complete rotor 12, 22 revolution. Each rotor face 13 completes a cycle in every revolution. There are two rotors 12,22, for a total of six rotor faces 13, thereby allowing the engine 60 to produce significant power within a relatively small displacement.

The terms augmentation, augmenter, and/or augmenting are used to describe the process where a remaining compressed air charge 51 (FIGS. 2f and 3f) from the first rotary unit 10 and fuel 42 are combusted in the first rotary unit 10 to augment the engine power. When positive displacement compression is physically separate from the power producing feature there is often unused remaining compressed air. It is this unused remaining compressed air that is referred to as the remaining compressed air charge 51. It is this remaining compressed air charge 51 that is mixed with fuel 42 and an second rotary unitexhaust 58 from the second rotary unit 20. This mixture is combusted in the first chamber 14 of the first rotary unit 10. The mixture is ignited either via auto ignition (diesel) or with a spark. Otherwise the majority of the work done to compress this remaining compressed air charge 51 would be lost when it is exhausted. The fuel 42 may be introduced into the second passageway 32 between the two rotary units 10,20. Alternatively, the fuel 42 may be introduced into the first rotor 12 directly. This augmented combustion can be selectively activated and de-activated throughout the compound rotary engine's 60 mission.

FIGS. 2a-2g are one non-limiting embodiment of an augmented mode compound rotary engine 60. The augmented mode compound rotary engine 60 has a first rotary unit 10 coupled with a second rotary unit 20. A compressed air charge 53 is communicated from the first rotary unit 10 to the second rotary unit 20 via passageway 30. A second rotary unit exhaust 58 is communicated from the second rotary unit 20 to the first rotary unit 10 via passageway 32. The first rotary unit 10 has a first injector 70 in communication with the chamber of the first rotor 12. The second rotary unit 20 has a second injector 71 in communication with the chamber of the second rotor 22.

Referring to FIG. 2a, a fresh air charge 50 is drawn in through an inlet port 18 into a first rotary unit 10. As the volume in the chamber increases, a partial vacuum, or lower pressure than ambient environment, is created and the higher pressure from the ambient environment forces in the fresh air charge 50.

Referring to FIG. 2b, the first rotor 12 compresses the fresh air charge 50 (not shown) into a compressed air charge 53. The compressed air charge 53 reaches a pressure that overcomes the spring force that normally keeps the first passageway check valve 31 closed. Once opened, the compressed air charge 53 flows into the second rotary unit 20. In another non limiting embodiment the check valve is omitted.

Referring to FIG. 2c, the second rotor 22 further compresses the compressed air charge 53 (not shown) into a compound compressed air charge 52. A compound compressed air charge 52 is a compressed air charge 53 which is then further compressed in the second rotary unit 20 in advance of combustion.

Referring to FIG. 2d, the second rotor 22, near or at top dead center, wherein the chamber of second rotor 22 is at or near minimal working volume, is injected with fuel 42 via the second injector 71. Combustion can be initiated via auto ignition (diesel) or spark ignition (not shown).

Referring to FIG. 2e, the second rotary unit exhaust 58 leaves the second rotary unit 20 via a second passageway 32. The pressure of the second rotary unit exhaust 58 overcomes the spring force that normally keeps the second passageway check valve 34 closed. Once opened, the second rotary unit exhaust 58 flows into the second rotary unit 20. In another non limiting embodiment the second passageway check valve 34 is omitted.

Referring to FIG. 2f the second rotary unit exhaust 58 enters the chamber of first rotor 12. Here the second rotary unit exhaust 58 mixes with and further compresses the remaining compressed air charge 51. The remaining compressed air charge 51 is the portion of compressed air charge 53 that is not transferred to the second rotary unit 20, and thereby remains in the rotary first rotary unit 10. The first injector 70 injects fuel 42 to form a combustible mixture. Either through auto ignition (diesel) or spark ignition (not shown), the combustible mixture combusts. Alternatively the remaining compressed air charge may be mixed with fuel injected at the injector 71 to form a combustible mixture. The combustible mixture is combusted either through auto ignition (diesel) or spark ignition (not shown), prior to mixing with the second rotary unit exhaust 58. In either variant, the first rotary unit exhaust 54 continues to further expand, asserting pressure on the rotor face 13, thereby causing the rotor 12 to rotate and drive a common shaft (not shown).

Referring to FIG. 2g, the first rotary unit exhaust 54 exits the first rotary unit 10 via an exhaust port 19. The force behind this action is that the first rotary unit exhaust 54 is at a higher pressure than the ambient atmosphere.

It should be noted that this secondary combustion can be selectively activated and de-activated throughout the compound rotary engine's 60 mission. The compound rotary engine 60 simultaneously offers high power density (number of horsepower or fractional horsepower per pound of engine weight) and low fuel consumption resulting in a comparably smaller power plant envelope. This rotary engine 60 can be utilized for various commercial, industrial, compact portable power generation, and aerospace applications.

FIG. 3a-3g represents a non-limiting embodiment of an augmented compound rotary engine 60. The augmented compound rotary engine 60 has a first rotary unit 10 coupled with a second rotary unit 20. A compressed air charge 53 is communicated from the first rotary unit 10 to the second rotary unit 20 via passageway 30. The second rotary unit exhaust 58 is communicated from the second rotary unit 20 to the first rotary unit 10 via passageway 32. The second rotary unit 20 has the injector 71 in communication with the second chamber 24 of second rotor 22. The second passageway 32 is in communication with an additional injector 73.

Referring to FIG. 3a, a fresh air charge 50 is drawn in through an inlet port 18 into the first rotary unit 10. As the volume in the chamber increases, a partial vacuum, or lower pressure than ambient environment, is created and the higher pressure from the ambient environment forces the fresh air charge 50 in.

Referring to FIG. 3b, the first rotor 12 compresses the fresh air charge 50 (not shown) into a compressed air charge 53. The compressed air charge 53 reaches a pressure that overcomes the spring force that normally keeps the first passageway check valve 31 closed. Once opened, the compressed air charge 53 flows into the second rotary unit 20. In another non limiting embodiment the first passageway check valve 31 is omitted.

Referring to FIG. 3c, there is shown the second rotor 22 further compressing the compressed air charge 53 (not shown) into a compound compressed air charge 52. A compound compressed air charge 52 is a compressed air charge 53 which is then further compressed in the second rotor in advance of combustion.

Referring to FIG. 3d, the second rotor 22, near or at top dead center, wherein the second chamber 24 is at or near minimal working volume, is injected with fuel 42 via the injector 71. The mixture of the compound compressed air charge 52 and the fuel 42 is then combusted. Combustion can be initiated via auto ignition (diesel) or spark ignition (not shown).

Referring to FIG. 3e, the second rotary unit exhaust 58 leaves the second rotary unit 20 via a second passageway 32. The pressure of the second rotary unit exhaust 58 reaches a pressure that overcomes the spring force that normally keeps the second passageway check valve 34 closed. In another non limiting embodiment the second passageway check valve 34 is omitted.

Referring to FIG. 3f, the second rotary unit exhaust 58 enters the first rotary unit 10 first chamber 14. Here the second rotary unit exhaust 58 mixes with fuel 42 injected via the injector 73 and further compresses the remaining compressed air charge 51. The remaining compressed air charge 51 is the portion of compressed air charge 53 that is not transferred to the second rotary unit 20, and thereby remains in the rotary first rotary unit 10. The mixture is combusted either through auto ignition (diesel) or spark ignition (not shown). In either variant, the first rotary unit exhaust 54 continues to further expand, asserting pressure on the rotor face 13, thereby causing the rotor 12 to rotate and drive a common shaft (not shown).

Referring to FIG. 3g, the first rotary unit exhaust 54 leaves the first rotary unit 10 via an exhaust port 19. The force behind this action is that the first rotary unit exhaust 54 is at a higher pressure than the ambient atmosphere.

It should be noted that this secondary combustion afterburning mode can be selectively activated and de activated throughout the engine's mission. The compound rotary engine 60 simultaneously offers high power density and low fuel consumption for various commercial, industrial, compact portable power generation, and aerospace applications.

When referring to either the first or second passageway check valves 31 and 34 respectively, the term check valve is noted to be a generic term. This term can encompass a solenoid type valve, a spring type valve, a reed type valve, or any other valve that permits flow in one direction. Additionally, as previously stated, these valves can be omitted.

When referring to the injector 70, 71 and 73, it should be noted that the term injector is a generic term. The injector used in communication with the chambers 14, 24 of the first and second rotor 12, 22 respectively, and in communication with the second passageway 32 may be of many different types. They may be mechanically controlled via spring force to set popping pressures. They may be electronically controlled via solenoids to activate fuel atomization. They may have various spray patterns to direct the fuel in the most efficient mixing methods.

When referring to the chamber of the first rotor 12, it can also be referred to as a first chamber. When referring to the chamber of the second rotor 22, it can also be referred to as a second chamber.

When referring to all Figures, it should be noted that the rotors 12,22 are physically present in each of their respective rotary units 12,20 at all times. In order to draw the reader's attention to the rotary unit 10,20 where an action or process is being described, only those rotors 12,22 are represented in their respective Figures.

The use of the terms "a" and "an" and "the" and similar references in the context of description (especially in the context of the following claims) are to be construed to cover both the singular and the plural, unless otherwise indicated herein or specifically contradicted by context. The modifier "about", used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A process of extracting work out of a rotary engine comprising:
    drawing a fresh air charge into a first rotary unit;
    compressing the fresh air charge into a compressed air charge and a remaining compressed air charge in the first rotary unit;
    transmitting the compressed air charge from the first rotary unit to a second rotary unit;
    compressing the compressed air charge into a compound compressed air charge in the second rotary unit;
    injecting a first fuel into the compound compressed air charge in the second rotary unit;
    combusting the first fuel with the compound compressed air charge into an exhaust in the second rotary unit;
    expanding the exhaust in the second rotary unit;
    transmitting the exhaust from the second rotary unit into the remaining compressed air charge in the first rotary unit;
    injecting a second fuel into the exhaust and the remaining compressed air charge in the first rotary unit; and
    combusting the second fuel with the remaining compressed air charge and the exhaust within the first rotary unit to initiate an afterburning mode.

* * * * *